(12) United States Patent
Zengerink

(10) Patent No.: US 12,301,161 B2
(45) Date of Patent: May 13, 2025

(54) SILO AND COVER THEREFOR

(71) Applicant: Dutch Cover Solutions B.V., Hengelo (NL)

(72) Inventor: Johannes Hubertus Zengerink, Hengelo (NL)

(73) Assignee: DUTCH COVER SOLUTIONS B.V., Hengelo (NL)

( * ) Notice: Subject to any disclaimer, the term of this patent is extended or adjusted under 35 U.S.C. 154(b) by 144 days.

(21) Appl. No.: 17/993,115

(22) Filed: Nov. 23, 2022

(65) Prior Publication Data
US 2023/0170839 A1 Jun. 1, 2023

(30) Foreign Application Priority Data
Dec. 1, 2021 (NL) .................................. 2029970

(51) Int. Cl.
*H02S 20/23* (2014.01)
*B65D 88/08* (2006.01)
*B65D 90/00* (2006.01)
*E04H 7/22* (2006.01)

(52) U.S. Cl.
CPC .............. *H02S 20/23* (2014.12); *B65D 88/08* (2013.01); *B65D 90/00* (2013.01); *E04H 7/22* (2013.01)

(58) Field of Classification Search
CPC ........... E04H 7/22; H02S 20/23; B65D 88/08; B65D 90/00
See application file for complete search history.

(56) References Cited

U.S. PATENT DOCUMENTS

| | | | | |
|---|---|---|---|---|
| 2,895,400 A | * | 7/1959 | Topf .................. | A01F 25/14 454/182 |
| 8,561,315 B2 | * | 10/2013 | Thompson .............. | F26B 9/063 34/169 |
| 11,566,936 B1 | * | 1/2023 | Western ............... | G01G 23/012 |
| 2012/0149291 A1 | * | 6/2012 | Roderick ................ | F24F 11/63 454/251 |

(Continued)

FOREIGN PATENT DOCUMENTS

| CN | 206728634 U | 12/2017 |
|---|---|---|
| CN | 107371652 B | 9/2019 |

(Continued)

OTHER PUBLICATIONS

Search Report and Written Opinion, dated Jun. 29, 2022, for Application No. NL2029970, (11 pages).

*Primary Examiner* — Mark R Wendell
(74) *Attorney, Agent, or Firm* — KDW Firm PLLC

(57) ABSTRACT

The invention relates to a silo for storing for instance manure, wherein the silo is covered on an upper side thereof with a flexible roof, wherein the roof is manufactured from a flexible material or is otherwise deformable, wherein at least one flexible photovoltaic device is arranged on the roof, wherein the at least one flexible photovoltaic device is fastened to the flexible roof by means of first fastening means which are fixed permanently onto the roof, and second fastening means which are fixed onto the at least one flexible photovoltaic device, wherein the first fastening means and the second fastening means are mutually releasable and reconnectable to each other in order to thus fasten the at least one flexible photovoltaic device releasably to the roof. The invention also relates to a cover for such a silo.

18 Claims, 2 Drawing Sheets

(56) References Cited

U.S. PATENT DOCUMENTS

2021/0153528 A1\* 5/2021 Young .................... B65D 88/74
2021/0223089 A1\* 7/2021 Montplaisir ............ G01S 17/08
2022/0356726 A1\* 11/2022 Venter .................... H02S 30/20

FOREIGN PATENT DOCUMENTS

| CN | 110301231 | A | 10/2019 |
| CN | 112012544 | A | 12/2020 |
| EP | 3437508 | A1 | 2/2019 |
| WO | 2013162376 | A1 | 10/2013 |
| WO | 2018218282 | A1 | 12/2018 |

\* cited by examiner

SILO AND COVER THEREFOR

CROSS-REFERENCE TO RELATED APPLICATIONS

This application claims priority to Netherlands national patent application serial number 2029970, filed Dec. 1, 2021, titled "Silo and Cover Therefor", the entirety of which application is incorporated by reference herein.

FIELD OF THE DISCLOSURE

The invention relates to a silo for storing for instance manure, wherein the silo is covered on an upper side thereof with a flexible roof, wherein the roof is manufactured from a flexible material, which is optionally supported by a central column, or is otherwise deformable.

BACKGROUND OF THE DISCLOSURE

Such a silo is per se known and is used in for instance agricultural companies for storing and/or fermenting manure, among other things. Although it is possible to leave the silo open, a cover is generally provided, on one hand to prevent rainwater from diluting manure contained in the silo and on the other to prevent or limit emissions from the silo.

Silos take up a relatively large amount of space, whereby this space cannot be used for for instance grazing, cultivation or generating energy. There is therefore a wish to use the space taken up by the silos more effectively.

SUMMARY OF THE DISCLOSURE

According to the invention, this wish is met when in a silo according to the preamble at least one flexible photovoltaic device is arranged on the roof, wherein the at least one flexible photovoltaic device is fastened to the flexible roof by means of first fastening means which are fixed permanently onto the roof, and second fastening means which are fixed, optionally permanently, onto the at least one flexible photovoltaic device, wherein the first fastening means and the second fastening means are mutually releasable and reconnectable to each other in order to thus fasten the at least one flexible photovoltaic device releasably to the roof.

It is noted that the releasable connection makes it possible to remove the photovoltaic devices from the silo or the roof for maintenance. Because such maintenance is essential, it is generally not possible to use permanently attached photovoltaic devices. Owing to the releasable connection, the photovoltaic devices can also be exchanged for different ones, for instance when they are damaged.

It is noted that the flexible roof can be a single-layer roof, which is for instance manufactured from a plastic sheet. Such a roof can be manufactured substantially from polyester and can for instance be coated with an optionally synthetic coating, preferably on both sides of the material. Nevertheless, the invention can also be applied to double membrane roofs for for instance silos. Such double membrane roofs also comprise a flexible sheet to which the photovoltaic devices can be fastened.

As known in the market, flexible photovoltaic devices, i.e. flexible solar cells, are substantially different from the known rigid panels. Flexible photovoltaic devices are substantially flat, but can for instance be bent and/or rolled up in simple manner without causing damage to the device. In the case of rigid solar panels it is impossible to bend and/or roll the panels. An attempt at bending will result, at most, in a slight movement accompanied by great elastic forces which urge the panel back to its original form. As is known, the panels are very rigid. Flexible panels can conversely be bent without generating such elastic forces, among other reasons because they are very thin (for instance <1 cm thick). It is therefore very easy for the skilled person to distinguish between a solar panel, which is rigid, and a flexible photovoltaic device which, in contrast to a panel, is flexible, as stated.

The fact that the photovoltaic device is flexible ultimately ensures a good co-action with the roof, which is also flexible, because it can be made from a sheet (or can comprise a sheet). Because such a sheet is also flexible, i.e. is deformable such that it can be rolled up, the properties of at least a part of the roof correspond to those of the photovoltaic device.

The skilled person knows that flexible roofs are distinguished from other roofs, which are rigid, by the weight of the roofs, among other things. This is because a sheet of a flexible roof is many times lighter than steel or concrete constructions used in rigid roofs.

A flexible roof further differs from a normal roof in that the flexible roof can be partially released, rolled aside or folded aside, making the silo accessible for for instance maintenance. Also providing flexible photovoltaic devices will not limit this behaviour. The flexible photovoltaic devices otherwise also have the advantage that they can be mounted on a flexible roof, for instance when this roof consists of or comprises a sheet. Rigid panels cannot be mounted thereon, for example because they require a screw connection.

The fastening means can be formed by the two parts of a hook and loop fastening. Such a connection is highly suitable because an extremely good connection to the roof and the photovoltaic device can be obtained owing to its flexible character. A reliable connection can thereby be obtained, which may result in less exposure to weather influences owing to the improved connection.

It is noted that the fastening means could be replaced with adhesive, for example. It is possible to apply such a permanent fastening, for instance in combination with features described further below. It is noted that alternative and/or additional measures can then be taken for removing the photovoltaic devices for for instance maintenance. Other fastening techniques are not precluded either.

The first fastening means can for instance be welded to the roof. This results in a permanent connection between this results in a permanent connection between the first fastening means, so that photovoltaic devices can be arranged at the correct position in simple manner.

An alternative option for attaching the first fastening means to the roof is sewing. Welding and sewing can optionally be combined.

The second fastening means can be arranged on the rear side of the at least one photovoltaic device. The rear side, which forms the contact surface with the silo roof, can hereby be used to attach the photovoltaic devices. It is noted that this form of attachment is particularly advantageous when using flexible photovoltaic devices, because known methods, such as clamping of the devices, do not always result in a sufficiently safe attachment.

The second fastening means can be arranged by means of an adhesive substance, such as a glue or cement. A glue or cement which remains sufficiently flexible to accommodate the flexibility of the roof and the photovoltaic devices is preferably opted for.

Both the first and the second fastening means can comprise a plurality of mutually separate parts. In this way a fastening point can be realized at several locations, without this taking up a large surface area of fastening means. The fastening can thus be strengthened without a relatively great increase in the quantity of material needed and/or other additional costs.

Each of the first mounting means and the second mounting means can comprise a plurality of strips. A relatively reliable connection can be obtained in elegant manner by means of the strips.

In an embodiment of the silo the at least one photovoltaic device is substantially elongate and defines two end zones lying opposite each other, wherein second fastening means are arranged in each end zone.

Fastening the elongate devices to both end zones creates a reliable connection for flexible photovoltaic devices which has not yet been used heretofore. The second fastening means arranged in each end zone can particularly be arranged at a mutual distance.

In an embodiment of the silo the roof is substantially circular in top view. The roof can for instance be (frusto) conical.

The at least one photovoltaic device can in that case extend radially over the roof, preferably between the centre and the edge. A (frusto)conical roof has a relatively small curvature in this direction, whereby the flexible device need likewise bend less.

A plurality of photovoltaic devices can alternatively and/or additionally be distributed over the roof at different angular positions. By distributing a plurality of devices over the angular positions a greater angular portion of the roof can be covered without the flexible devices having to span the whole curvature of the roof over the whole angular portion. Less bending of the flexible photovoltaic device is required hereby.

The plurality of photovoltaic devices can also be distributed over the roof at different radial positions. In this way a relatively large part of the roof can be covered with photovoltaic devices with a fixed form, particularly a rectangular form.

A plurality of photovoltaic devices can particularly be distributed over the roof such that the number of photovoltaic devices per unit area of the roof varies locally.

By locally varying the density a relatively large amount of sunlight can be captured with a relatively small area of devices by taking into consideration the direction of incidence of the light. A part of the roof which generally faces toward a direction of incidence of sunlight can particularly be provided with a relatively high density of devices. The surface area of the device(s) could of course also be increased locally in order to achieve the same effect.

The at least one photovoltaic device can be electrically connected to a converter by means of a breakable, and reconnectable, coupling. Removing, repositioning and/or replacing and/or exchanging the device is relatively simple by means of such a coupling.

It is also possible to connect a plurality of photovoltaic devices to the same converter, for instance the above stated converter, optionally with the above stated coupling.

The converter need in this way not be replaced when replacing the flexible devices, for instance when they have incurred damage. This can save considerable replacement costs, but also installation costs.

The invention also relates to a cover for forming a roof for a silo, with the features described in respect of the roof of a silo as above, in any suitable combination.

BRIEF DESCRIPTION OF THE DRAWINGS

The invention will be further elucidated with reference to the figures, in which.

DETAILED DESCRIPTION

Figure 1:
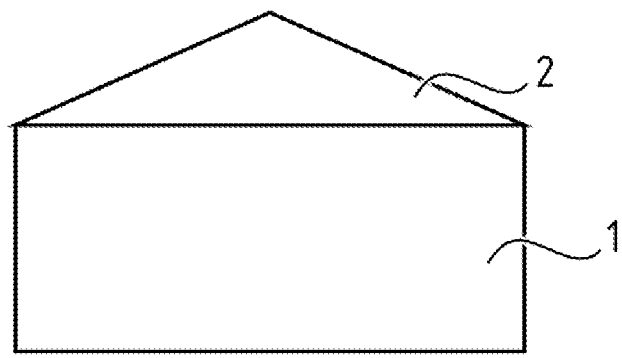
FIG. 1 shows schematically a silo with a roof in side view.

Corresponding elements are designated in different figures with the same reference numeral, but increased by 100 (one hundred).

FIG. 1 shows a silo 1 with a roof 2. The silo 1 is cylindrical and is for instance used to store manure. Arranged on silo 1 is a flexible roof 2 of a polyester material which is coated on both sides, in this specific case with a synthetic coating. This makes the flexible roof 2 watertight and weather-resistant. Emission through roof 2 is also limited. Roof 2 is conical and is suspended from a support structure in the centre of roof 2, and from the walls of silo 1.

Figure 2A:
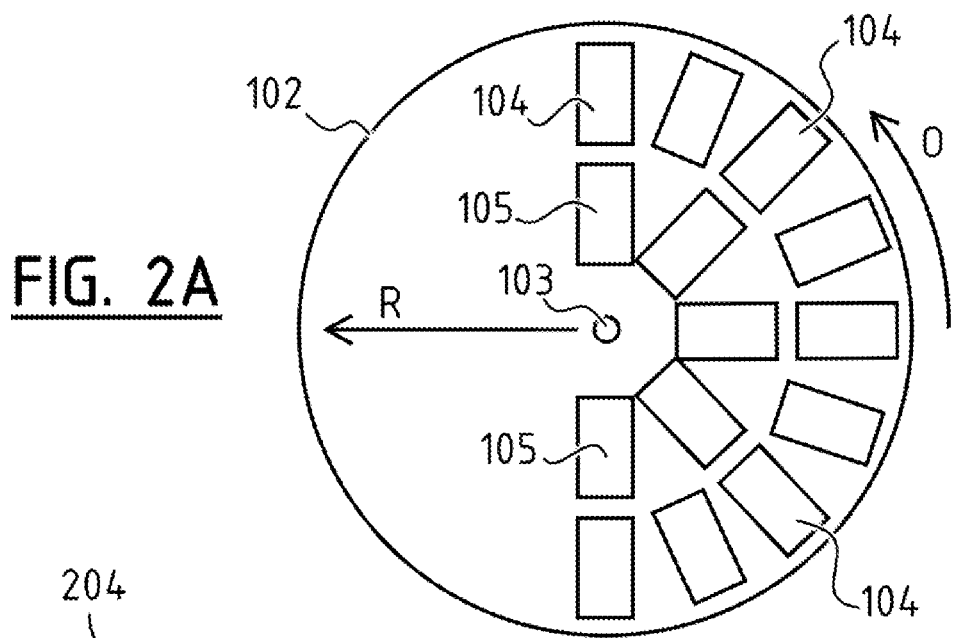
FIGS. 2A and 2B show different ways of covering the roof of FIG. 1 with photovoltaic devices, in a top view.
Figure 2B:
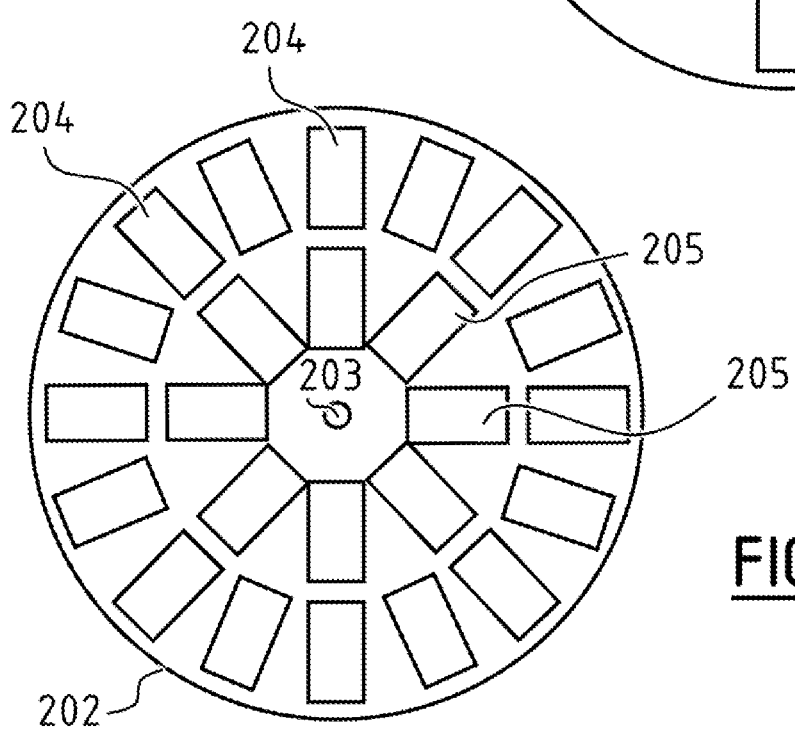

FIGS. 2A and 2B show roofs 102, 202 in top view. The support structure is partially visible in the form of a support 103, 203 in the centre of the roof 102, 202. Arranged on roof 102, 202 are photovoltaic devices 104, 105, 204, 205. A plurality of devices 104, 105, 204, 205 are distributed in the peripheral direction θ and lie at different distances in the radial direction R. This results in an inner ring of photovoltaic devices 105, 205 and an outer ring 104, 204. In the case of FIG. 2A only a part of roof 102 is covered, making the local density of photovoltaic devices higher on the right-hand side in the figure than on the left-hand side. In FIG. 2B substantially the whole roof 202 is covered with photovoltaic devices 204, 205.

Each photovoltaic device 104, 105, 204, 205 has a substantially rectangular form and is flexible. Photovoltaic devices 104, 105, 204, 205 are connected releasably to the roof 102, 202 by means of suitable fastening means, which will be elucidated further below.

Figure 3A:
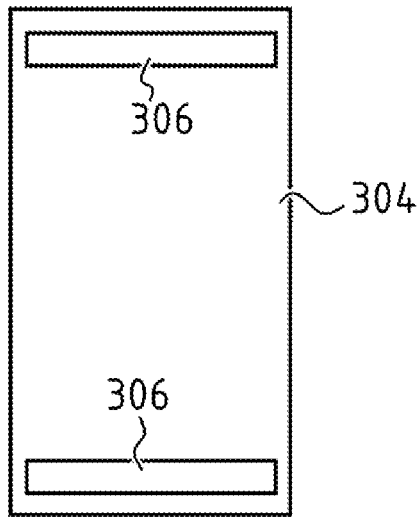
FIGS. 3A-3C show the rear sides of photovoltaic devices with second fastening means thereon.
Figure 3B:
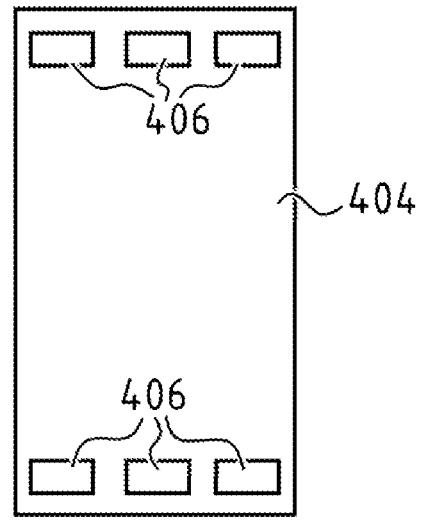
Figure 3C:
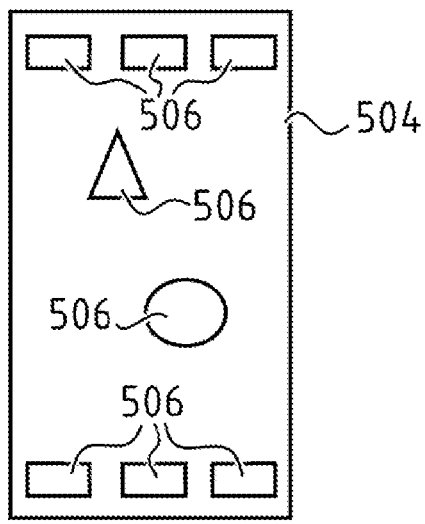

FIGS. 3A-3C each show the rear side of a photovoltaic device 304, 404, 504, which can be applied on the roofs 102, 202 of FIGS. 2A and 2B. Each device 304, 404, 504 is provided with second fastening means 306, 406, 506. The second fastening means of FIG. 3A are formed by two strips 306 which are arranged at the longitudinal ends of the photovoltaic device. In FIG. 3B use is made of a plurality of separate strips 406 close to each longitudinal end. Finally, FIG. 3C shows a number of different positions and shapes which are also applicable for the second fastening means 507. In these examples the second fastening means 306, 406, 506 are arranged on the rear side of photovoltaic devices 304, 404, 504 with an adhesive.

Although not necessarily, the second fastening means are in this case formed by one part of a hook and loop fastening. The first fastening means form the corresponding part.

First fastening means can of course be arranged on roof 2, 102, 202 with shapes and/or positions corresponding to those of the second fastening means 306, 406, 506.

Figure 4:
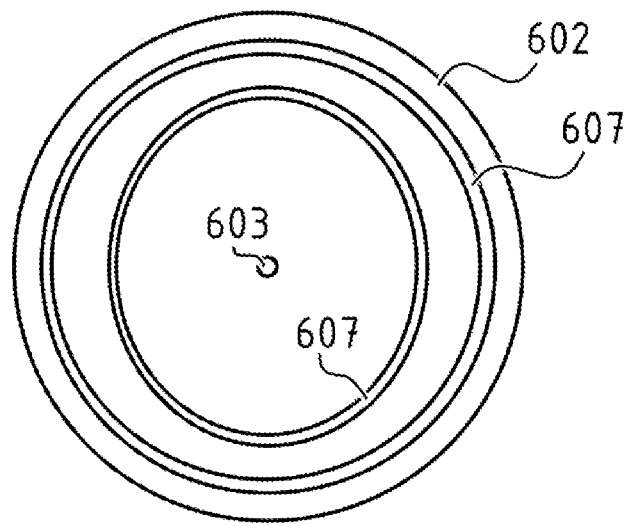
FIG. 4 shows a silo roof with first fastening means thereon.

FIG. 4 once again shows a top view of a silo roof 602, this time without photovoltaic devices. This makes visible first fastening means 607, which are in this case arranged all around roof 602 as two separate circular paths. The strips 306 of for instance photovoltaic devices 304 of FIG. 3A could be arranged thereon. A plurality of circular paths can of course be provided. Irrespective of the number or shape of the first fastening means 607, they can be welded fixedly to roof 602 just as they are in the shown example, whereby they are thus connected permanently to the roof.

It is noted that, although the invention is described above on the basis of specific examples and/or embodiments, the invention is not limited thereto. On the contrary, the invention is also defined by the appended claims.

What is claimed is:

1. A silo for storing for instance manure, wherein the silo is covered on an upper side thereof with a flexible roof,
   wherein the roof is manufactured from a flexible material so that the roof is rollable or foldable,
   wherein the roof is substantially circular in top view,
   wherein at least one flexible photovoltaic device is arranged on the roof, wherein the flexible voltaic device is capable of being bent or rolled up due to said flexibility,
   wherein the at least one flexible photovoltaic device is fastened to the flexible roof by means of first fastening means which are fixed permanently onto the roof, and second fastening means which are fixed onto the at least one flexible photovoltaic device,
   wherein the first fastening means and the second fastening means are mutually releasable and reconnectable to each other in order to thus fasten the at least one flexible photovoltaic device releasably to the roof, and
   wherein the at least one photovoltaic device extends radially over the roof.

2. The silo according to claim 1, wherein the first fastening means are welded to the roof.

3. The silo according to claim 1, wherein the second fastening means are arranged on the rear side of the at least one photovoltaic device.

4. The silo according to claim 1, wherein the first fastening means and the second fastening means each comprise respective mutually separate parts.

5. The silo according to claim 4, wherein the first mounting means and the second mounting each comprise a plurality of strips.

6. The silo according to claim 1, wherein the at least one photovoltaic device is substantially elongate and defines two end zones lying opposite each other, wherein second fastening means are arranged in each end zone.

7. The silo according to claim 6, wherein the second fastening means arranged in each end zone are arranged at a mutual distance.

8. The silo according to claim 1, wherein the first and second fastening means are formed by respective parts of a hook and loop fastening.

9. The silo according to claim 1, wherein the roof is substantially circular in top view and wherein a plurality of photovoltaic devices are distributed over the roof at different angular positions.

10. The silo according to claim 1, wherein the roof is substantially circular in top view and wherein a plurality of photovoltaic devices are distributed over the roof at different radial positions.

11. The silo according to claim 1, wherein a plurality of photovoltaic devices can be distributed over the roof such that the number of photovoltaic devices per unit area of the roof varies locally.

12. The silo according to claim 1, wherein the at least one photovoltaic device is electrically connected to a converter by means of a breakable, and reconnectable, coupling.

13. The silo according to claim 12, with a plurality of photovoltaic devices which are connected to the same converter.

14. A cover for forming a roof for a silo,
    wherein the roof is manufactured from a flexible material so that it is rollable or foldable,
    wherein the cover is substantially circular in top view,
    wherein at least one flexible photovoltaic device is arranged on the roof, wherein the flexible voltaic device is capable of being bent or rolled up due to said flexibility,
    wherein the at least one flexible photovoltaic device is fastened to the flexible roof by means of first fastening means which are fixed permanently onto the roof, and second fastening means which are fixed onto the at least one flexible photovoltaic device,
    wherein the first fastening means and the second fastening means are mutually releasable and reconnectable to each other in order to thus fasten the at least one flexible photovoltaic device releasably to the roof, and
    wherein the at least one photovoltaic device extends radially over the roof.

15. The cover according to claim 14, wherein the flexible material is supported by a central column.

16. The cover according to claim 14, wherein the second fastening means are fixed permanently onto the at least one flexible photovoltaic device.

17. The silo according to claim 1, wherein the flexible material is supported by a central column.

18. The silo according to claim 1, wherein the second fastening means are fixed permanently onto the at least one flexible photovoltaic device.

* * * * *